(12) United States Patent  
  Pappalardo

(10) Patent No.: US 9,289,797 B2  
(45) Date of Patent: Mar. 22, 2016

(54) DISPENSING ASSEMBLY AND METHOD FOR ASSEMBLING A DISPENSER AND DISPENSING A FLUID

(71) Applicant: Nordson Corporation, Westlake, OH (US)

(72) Inventor: Matthew E. Pappalardo, Ewing, NJ (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 13/669,641

(22) Filed: Nov. 6, 2012

(65) Prior Publication Data

US 2014/0124536 A1  May 8, 2014

(51) Int. Cl.
*B67D 7/70* (2010.01)
*B05C 17/005* (2006.01)
*F16L 37/12* (2006.01)

(52) U.S. Cl.
CPC ..... *B05C 17/00506* (2013.01); *B05C 17/00553* (2013.01); *F16L 37/1225* (2013.01); *Y10T 29/49826* (2015.01)

(58) Field of Classification Search
CPC .............. B05C 17/00566; B05C 17/01; B05C 17/00553; B05C 17/00506; B05C 17/00593; B05C 17/005; B05C 17/00516; B65D 55/08; B65D 55/02; B65D 55/10; B65D 25/48; B65D 81/325; B65D 81/3288; A61C 5/064; F16L 37/1225; Y10T 29/49826
USPC ............. 222/137, 142.3, 145.1, 145.5, 145.4, 222/145.6, 142.8, 153.01, 325, 326, 566, 222/567, 1, 94, 573, 136, 570; 29/428; 366/339
See application file for complete search history.

(56) References Cited

U.S. PATENT DOCUMENTS 4,753,536 A  *  6/1988 Spehar et al. ................. 366/339
4,974,756 A  * 12/1990 Pearson et al. ............... 222/562

(Continued)

FOREIGN PATENT DOCUMENTS

EP   1795145 A1   6/2007
WO  2007026169 A1   3/2007
WO  2007091071 A1   8/2007

OTHER PUBLICATIONS

European Patent Office, European Search Report in EP Application No. 13188659, Feb. 3, 2014.

*Primary Examiner* — Frederick C Nicolas
*Assistant Examiner* — Bob Zadeh
(74) *Attorney, Agent, or Firm* — Baker & Hostetler LLP

(57) ABSTRACT

A dispensing assembly and method for dispensing a mixture of a first fluid component and a second fluid component. The dispensing assembly generally comprises a container coupled with a nozzle in a unique manner to achieve a mechanical and fluid connection. More specifically, the container includes a first chamber and a second chamber. The first and second chambers are adapted to respectively hold the first and second fluid components. The nozzle has an inlet end and an outlet end. First and second connecting elements are located at the inlet end of the nozzle. Another mating pair of connecting elements, i.e., third and fourth connecting elements, of the container respectively communicate with the first and second chambers. The first and second connecting elements are respectively capable of being removable coupled to the third and fourth connecting elements to establish fluid paths from the first and second chambers into the inlet end of the nozzle. A coupling element selectively couples the inlet end of the nozzle to the container.

28 Claims, 5 Drawing Sheets

(56) References Cited

U.S. PATENT DOCUMENTS

| | | | |
|---|---|---|---|
| 5,005,735 A * | 4/1991 | Keller | 222/137 |
| 5,651,397 A * | 7/1997 | Black et al. | 141/18 |
| 5,924,600 A * | 7/1999 | Keller | 222/137 |
| 6,186,363 B1 | 2/2001 | Keller et al. | |
| 6,311,869 B1 * | 11/2001 | Horth et al. | 222/137 |
| 6,769,574 B1 | 8/2004 | Keller | |
| 6,840,462 B2 | 1/2005 | Hurray et al. | |
| 7,387,432 B2 * | 6/2008 | Lu et al. | 366/339 |
| 7,631,782 B2 | 12/2009 | Engelbrecht et al. | |
| 8,365,958 B2 * | 2/2013 | Ho et al. | 222/137 |
| 2007/0235546 A1 | 10/2007 | Strecker et al. | |
| 2008/0089173 A1 | 4/2008 | Lu et al. | |
| 2010/0012210 A1 * | 1/2010 | Miyano et al. | 137/896 |
| 2012/0199607 A1 * | 8/2012 | Keller | 222/145.5 |

* cited by examiner

DISPENSING ASSEMBLY AND METHOD FOR ASSEMBLING A DISPENSER AND DISPENSING A FLUID

TECHNICAL FIELD

The present invention relates generally to a dispensing assembly and methods assembling a dispenser and dispensing a fluid.

BACKGROUND

In the dispensing field, it is common to mix two or more fluid components to form a mixed fluid shortly before dispensing. For example, first and second fluids, such as first and second liquid adhesive components may be mixed to form a curable liquid adhesive for application onto a workpiece or substrate. The first and second liquid adhesive components are each separately contained within separate chambers of a suitable container. One type of container is known as a dual-chamber cartridge. A nozzle is attached to component outlets of the cartridge and pressure is applied to the first and second liquid components in order to force the first and second liquid components into the nozzle. A static mixer is also positioned within the nozzle. Accordingly, the first and second liquid components travel through the static mixer within the nozzle to dispense the fully mixed adhesive from a nozzle tip or outlet for application onto the workpiece or substrate. While this particular example forms a curable liquid adhesive for dispensing, any number and types of fluid components may be similarly mixed to create a mixed fluid that includes any variety of desirable properties for use by the end-user.

The two or more fluid components may be directed into the mixing nozzle in equal or unequal volumes depending on the necessary fluid ratio for the application. Often, the cartridge outlets are in a side-by-side configuration. The side-by-side configuration produces a cross-section of fluid also having the fluid components in side-by-side contact. Thus, the fluid components remain relatively unmixed, which may greatly reduce beneficial properties of the mixed fluid. For instance, improperly mixed liquid adhesive may not effectively cure, causing partial or total failure of the adhesive in use. Another associated challenge relates to the mechanical and fluid connection made between the nozzle and the dual chamber cartridge. Similar challenges may exist with respect to dispensers configured to dispense only a single fluid.

Improvements would be desirable to ensure that this connection is quick and easy to make, and yet mechanically robust while, in the case of mixing and then dispensing multiple fluids, maintaining separation of the fluid components and then premixing at the inlet end of the nozzle.

SUMMARY OF THE INVENTION

Generally, in an illustrative embodiment, the invention provides a dispensing assembly for dispensing a fluid. The fluid may be a single fluid, or a fluid comprising a mixture of two or more fluid components. The dispensing assembly includes a container including a chamber for holding at least one component of the fluid. A nozzle is provided having an inlet end and an outlet end. A first connecting element is positioned at the inlet end of the nozzle. A second connecting element is associated with the container and communicates with the chamber. The first and second connecting elements are capable of being removably coupled to each other to establish a fluid path from the chamber into the inlet end of the nozzle. A coupling element selectively couples the inlet end of the nozzle to the container.

In another illustrative embodiment, a dispensing assembly is provided for dispensing a mixture of a first fluid component and a second fluid component. The dispensing assembly generally comprises a container coupled with a nozzle in a unique manner to achieve a mechanical and fluid connection. More specifically, the container includes a first chamber and a second chamber. The first and second chambers are adapted to respectively hold the first and second fluid components. The nozzle has an inlet end and an outlet end. First and second connecting elements are located generally at the inlet end of the nozzle. Another mating pair of connecting elements, i.e., third and fourth connecting elements, are associated with the container and respectively communicate with the first and second chambers. The first and second connecting elements are respectively capable of being removably coupled to the third and fourth connecting elements to establish fluid paths from the first and second chambers into the inlet end of the nozzle. For purposes of making a secure mechanical connection, a coupling element is provided and selectively couples the inlet end of the nozzle to the container.

Additional features may also be provided to achieve various embodiments of the invention. For example, the first and second connecting elements can be part of a unitary element positioned generally between the inlet end of the nozzle and the third and fourth connecting elements. This element may be a separate component in the form of an insert capable of being placed at least partially within the inlet end of the nozzle, for example, or the element may be formed as an integral part of the nozzle. The coupling element can further comprise a slide element carried for sliding movement along support structure on the container. The slide element is slidable between locked and unlocked positions. The nozzle may be decoupled from the container when the slide element is in the unlocked position. The slide element may further comprise a U-shaped element that includes an open end and a closed end, with the open end receiving and coupling to the inlet end of the nozzle when in the locked position. The inlet end of the nozzle can include a flange and the U-shaped slide element can then include a recess receiving the flange to couple the U-shaped slide element to the inlet end of the nozzle in the locked position. The support structure can more specifically comprise an upstanding rail extending from the container and having a generally T-shaped cross-section. In this case, the slide coupling element includes a flange engaging the rail for guiding the movement of the slide coupling element along the rail. With regard to the respective connecting elements, the first and second connecting elements may frictionally engage with the third and fourth connecting elements, with one of the connecting elements receiving the other of the connecting elements of each pair. The nozzle may contain at least one static mixer element for mixing the first and second fluid components prior to dispensing the mixed fluid components from the outlet end.

Generally, the invention provides a method of assembling a dispenser. The method includes the steps of fluidly coupling a first connecting element associated with an inlet end of a nozzle to a second connecting element of a container configured to hold a fluid in a chamber, and slidably moving a coupling element from an unlocked position to a locked position to couple the nozzle to the container.

In another aspect, the invention provides a method of assembling a dispenser configured to mix and dispense at least two fluid components. The method generally involves fluidly coupling first and second connecting elements associated with a nozzle to third and fourth connecting elements located on a container holding the first and second fluid components in respective first and second chambers. A coupling element is moved from an unlocked position to a locked position to couple the nozzle to the container. The first and second fluid components are then directed from the first and second chambers through the first, second, third and fourth connecting elements into the nozzle. The first and second fluid components are mixed in the nozzle, and then the mixture is directed out of the nozzle.

The method may include additional steps that involve use of the various features described herein. For example, moving the coupling element can further comprise sliding the coupling element along support structure on the container. In the case of a U-shaped slide coupling element, the open end slides over the inlet end of the nozzle into the locked position. Fluidly coupling the first and second connecting elements to the third and fourth connecting elements can further comprise friction fitting the first connecting element to the third connecting element and friction fitting the second connecting element to the fourth connecting element.

Various additional advantages and features of the invention will become more readily apparent upon review of the following detailed description of the illustrative embodiments, taken in conjunction with the accompanying drawings.

DETAILED DESCRIPTION

Figure 1:
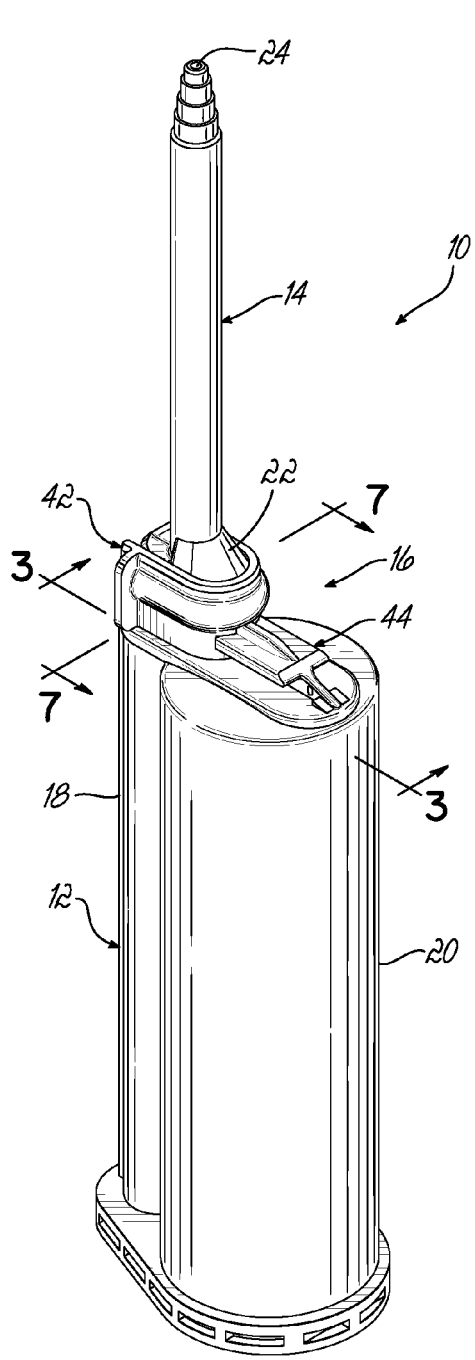
FIG. 1 is a perspective view of the assembled form of a dispensing assembly constructed in accordance with an illustrative embodiment of the invention.
Figure 2:
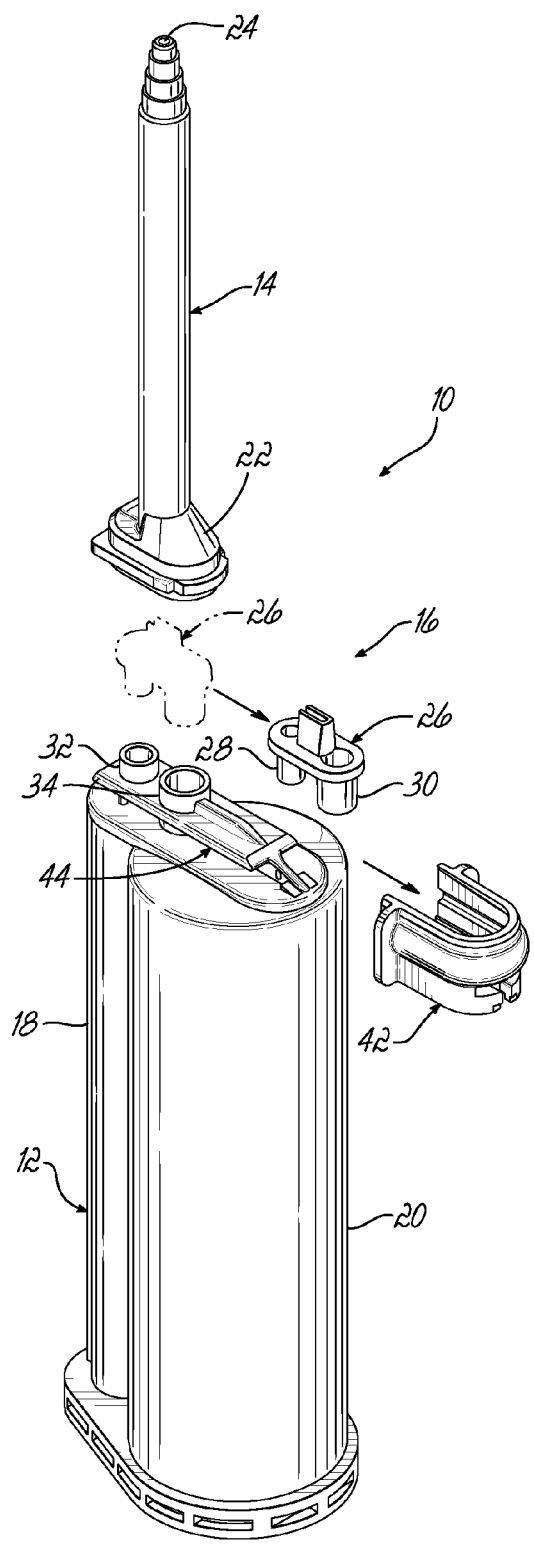
FIG. 2 is a perspective view of the disassembled parts of the dispensing assembly shown in FIG. 1.

FIGS. 1 and 2 illustrate a dispensing assembly 10 constructed in accordance with one illustrative embodiment of the invention. This embodiment is designed to mix and then dispense two fluid components, however, it will appreciated by those of ordinary skill that modifications may be made to the assembly if it is desired to dispense only a single fluid component, with no mixing. The dispensing assembly 10 generally comprises a container 12 coupled with a nozzle 14 at a mechanical and fluid coupling section 16 (FIG. 1). The container 12, in this embodiment, is a dual chamber cartridge having a first chamber 18 and a second chamber 20. The first chamber 18, as shown, has a smaller volume than the second chamber 20. However, it will be appreciated that the chambers 18, 20 may have any desired size, shape and volume ratios chosen in accordance with application needs. The container 12 may be constructed with any suitable configuration other than the specific configurations shown and described herein. Materials of construction may include plastics or other materials appropriate for the application needs and fluid components. The nozzle 14, as best shown in FIG. 2, has an inlet end 22 and an outlet end 24.

An insert 26 (FIG. 2) is positioned generally between the container 12 and the inlet end 22 of the nozzle 14. The insert 26 has first and second connecting elements 28, 30 in the form of stubs or projecting tubes that mate and provide fluid communication with respective third and fourth connecting elements 32, 34 in the form of projecting stubs or tubes extending from the container 12. The third connecting stub 32 communicates with the first chamber 18 while the fourth connecting stub 34 communicates with the second chamber 20. Therefore, the third and fourth connecting stubs 32, 34 are effectively the fluid outlets of the respective first and second chambers 18, 20. As will be appreciated from the description to follow, the first connecting stub 28 is received within the third connecting stub 32 with a friction fit and, likewise, the second connecting stub 30 is received within the fourth connecting stub 34 also with a friction fit. As also described below, this connection allows first and second fluid components 38, 40 (FIG. 3) to be directed respectively from the first and second chambers 18, 20 through the connecting stubs 28, 30, 32, 34 and into the inlet end 22 of the nozzle 14. The term "fluid" encompasses any material that exhibits fluid-like flow characteristics. Other configurations and designs for the connecting elements 28, 30, 32, 34 may be used instead. For example, the connecting elements 32, 34 on the container 12 may instead simply be respective ports, rather than projecting stubs or tubes, that the first and second connecting stubs 28, 30 frictionally fit within. Or, the opposite arrangement may be used, i.e., ports may be provided in the insert 26 or may be formed more directly in the inlet end 22 of the nozzle 14 that frictionally receive the third and fourth connecting stubs 32, 34.

A coupling element 42 is provided in the form of a U-shaped slide element and slides along an upstanding rail 44 rigidly connected to and extending from an outlet end 46 of the container 12. The U-shaped slide element 42 is moved along the upstanding rail 44 to the position shown in FIG. 1 to mechanically couple or generally lock the nozzle 14 to the container 12 while simultaneously providing for fluid communication between the first and second chambers 18, 20 and the inlet end 22 of the nozzle 14.

Figure 3:
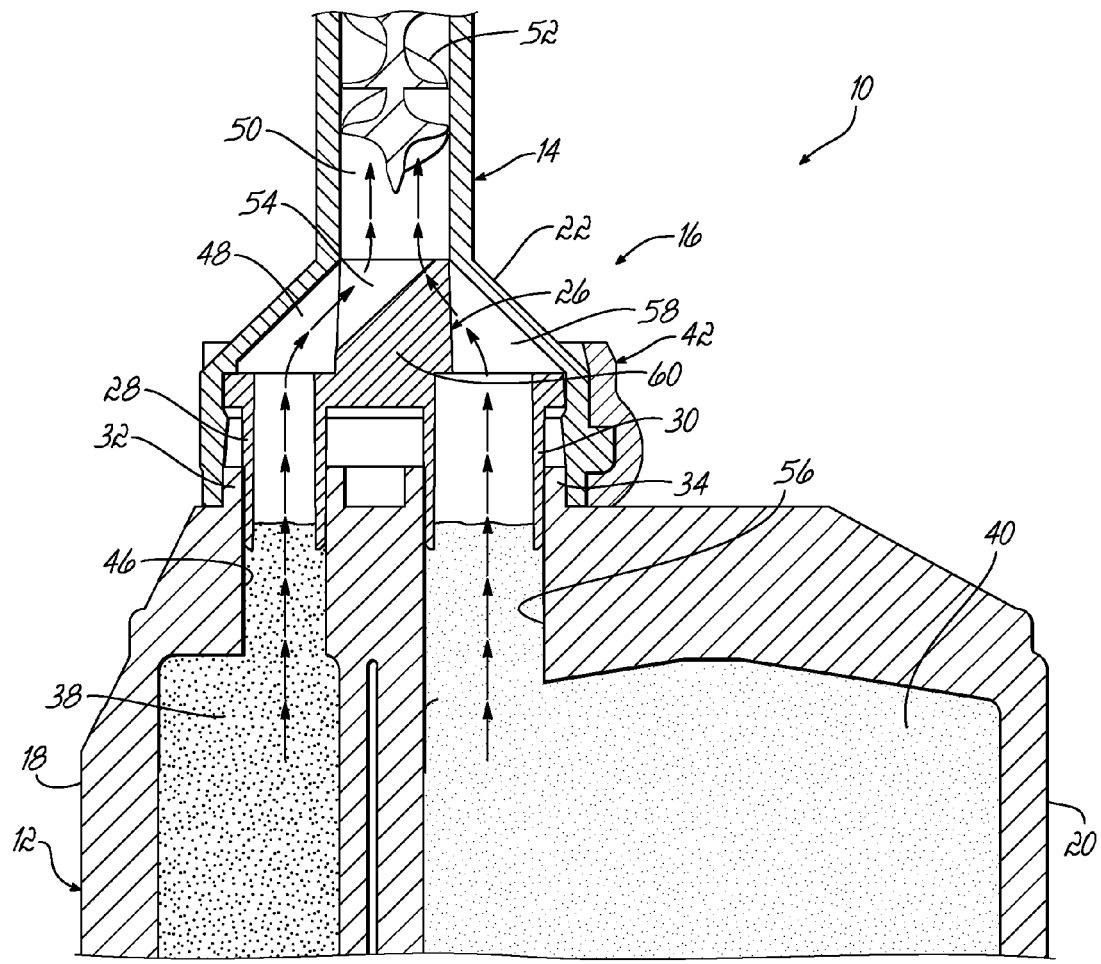
FIG. 3 is a cross sectional view taken along line 3-3 of FIG. 1.
Figure 4:
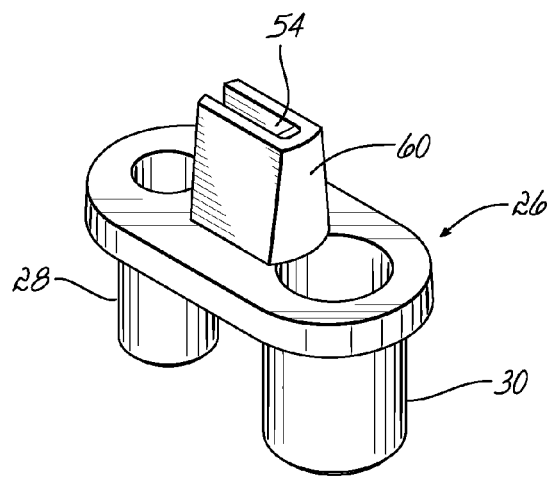
FIG. 4 is a perspective view of an insert used to direct fluid from the dual chamber cartridge into the nozzle.

FIG. 3 illustrates the dispensing assembly 10 in cross section, while FIG. 4 better illustrates the insert 26 in perspective view. Based on a review of FIGS. 3 and 4, therefore, it will be appreciated that the first fluid component 38 flows through the outlet 46 of the first chamber 18 and through the first and third connecting stubs 28, 32 which are coupled together, into an internal section 48 of the inlet end 22. The first fluid component 38 then flows into a main passage 50 of the nozzle 14 where it will be mixed with the second fluid component 40 by a static mixer element 52. The first fluid component 38 flows through an internal, angled slot 54 of the insert 26. The second fluid component 40 is directed from the outlet 56 of the second chamber 20 through the second connecting stub 30 and fourth connecting stub 34, which are coupled together, and into another internal section 58 of the inlet end 22 of the nozzle 14. The second fluid component 40 flows past an upstanding portion 60 of the insert 26 and into the main passage 50 to be mixed with the first fluid component 38. The fluid flow is more fully described in co-pending Patent Application Ser. No. 61/717,335, filed on Oct. 23, 2012, assigned to the assignee of the present invention, and the disclosure of which is hereby incorporated by reference herein.

Figure 5:
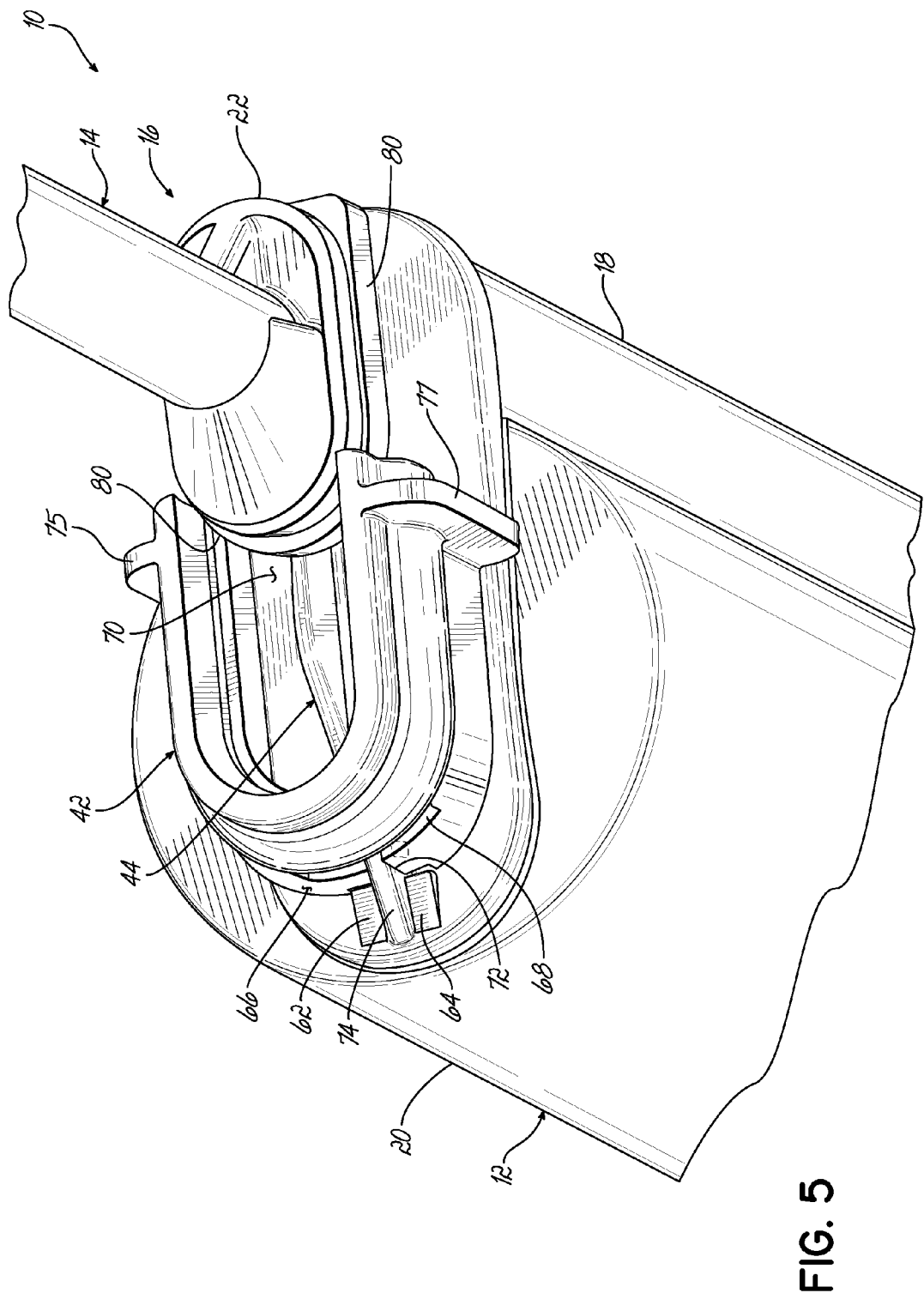
FIG. 5 is an enlarged perspective view showing the slide coupling element of the dispensing assembly in an unlocked position.
Figure 6:
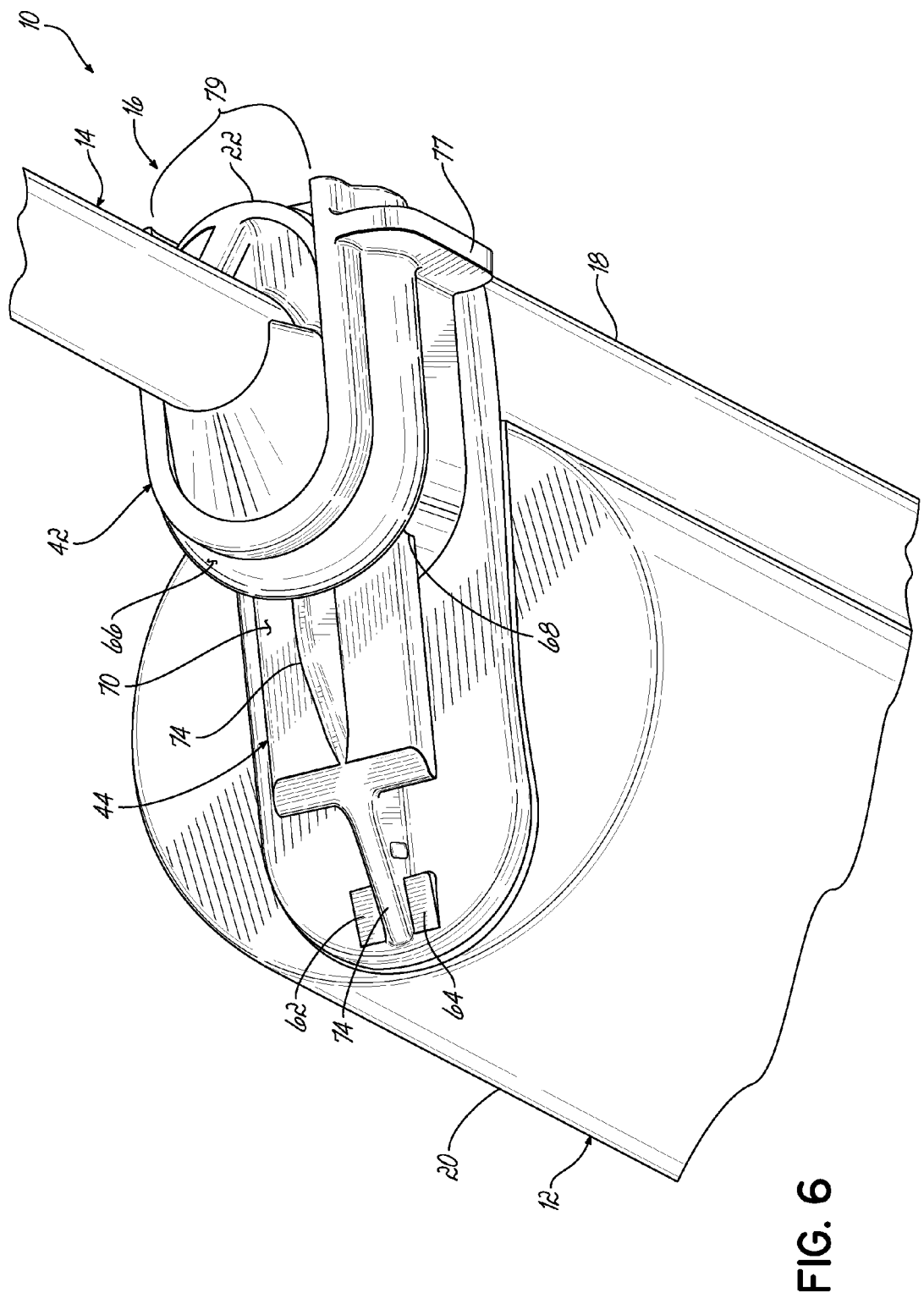
FIG. 6 is a perspective view similar to FIG. 5, but illustrating the slide coupling element in a locked position.
Figure 7:
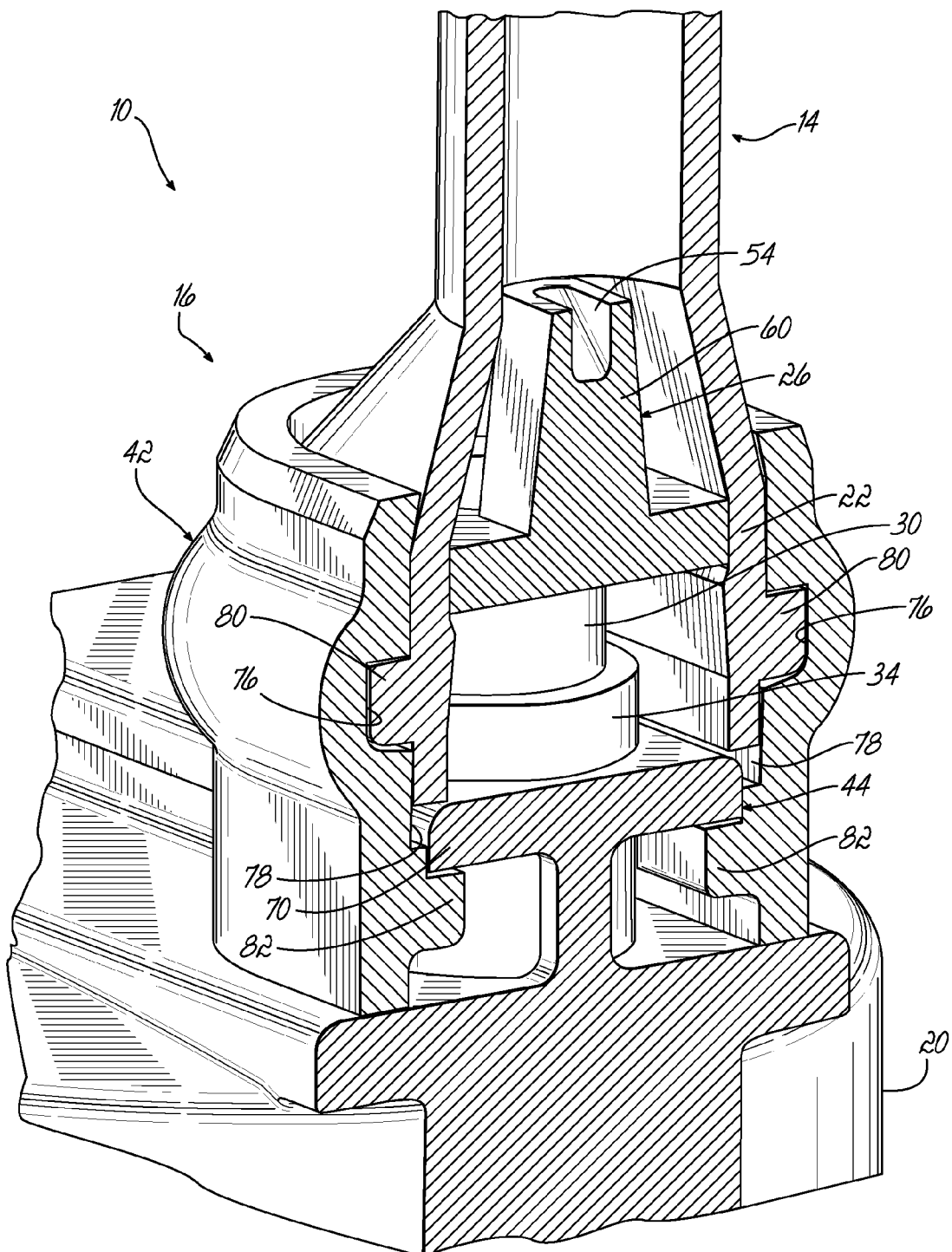
FIG. 7 is a cross sectional view taken along line 7-7 of FIG. 1.

FIGS. 5-7 best illustrate the mechanical coupling between the container 12 and the nozzle 14. The U-shaped slide element 42 is received on the upstanding rail 44 and is prevented from sliding off of the rail 44 in one direction by a pair of ramp elements 62, 64 that engage the rear or closed end 66 of the U-shaped slide element 42. The slide element 42 is prevented from sliding off the container 12 in the opposite direction by the fourth connecting stub 34 (see FIG. 2). The slide element 42 further includes a slot 68 in the closed end 66 that receives a horizontal section 70 of the rail 44 (see FIG. 6). A vertical slot 72 in the slide element 42 receives a vertical section 74 of the rail 44 as best shown in FIGS. 5 and 6. The rail 44 is molded around or with the upstanding connecting stubs 32, 34 of the container 12 (see FIG. 2). After the insert 26 has been coupled to the connecting stubs 32, 34 by frictionally engaging and inserting the first and second connecting stubs 28, 30 into the third and fourth connecting stubs 32, 34, the user slides the slide coupling element 42 from the position shown in FIG. 5 to the position shown in FIG. 6. Finger grips 75, 77 are provided on the slide element 42 for this purpose. It will be appreciated that an open end 79 of the slide element 42 receives and moves past the inlet end 22 of the nozzle 14 as well as the insert 26 and connecting elements 28, 30, 32, 34 in the process.

As shown best in FIG. 7, the slide coupling element 42 includes a recess 76 along an internal wall 78 that receives a flange 80 extending outwardly from the inlet end 22 of the nozzle 14. Engagement of the recess 76 and the flange 80 mechanically couples the slide coupling element 42 to the inlet end 22 of the nozzle 14. The slide coupling element 42 mechanically couples to the container 12 as an internal flange 82 of the slide coupling element 42 rides beneath the horizontal section 70 of the rail 44. Thus, the interaction of the flange 82 and the rail 44 serves as both a guide for the sliding movement and a mechanical coupling to prevent disengagement of both the slide coupling element 42 and the attached nozzle 14 from the container 12. Once connected in the manner shown in FIGS. 6 and 7, the first and second fluid components 38, 40 may be forced from the first and second chambers 18, 20 (FIG. 3) by any suitable means, such as by the use of air pressure and/or respective piston elements (not shown) in the chambers 18, 20, as is known, for directing the first and second fluid components 38, 40 in the manner shown in FIG. 3 through the inlet end 22 of the nozzle 14 and into the main passage 50. The fluid components 38, 40 are mixed by the static mixer element 52 and finally discharged as a mixture through the outlet end 24 (FIGS. 1 and 2).

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A dispensing assembly for dispensing a fluid, comprising:
    a container including a chamber for holding at least one component of the fluid;
    a nozzle having an inlet end and an outlet end;
    first connecting element at the inlet end of the nozzle;
    second connecting element associated with the container and communicating with the chamber, the first connecting element and the second connecting element capable of being removably coupled to each other to establish a fluid path from the chamber into the inlet end of the nozzle;
    a coupling element operative to selectively couple the inlet end of the nozzle to the container; and
    support structure including an upstanding rail extending from the container and having a generally T-shaped cross-section;
    wherein the coupling element further comprises a slide element carried for sliding movement along the support structure on the container, the slide element including a flange engaging the rail for guiding the movement of the slide element along the rail and being slidable between locked position and unlocked position, wherein the nozzle is capable of being decoupled from the container when the slide element is in the unlocked position.

2. The dispensing assembly of claim 1, wherein the first connecting element is part of a unitary insert positioned between the inlet end of the nozzle and the second connecting element.

3. The dispensing assembly of claim 1, wherein the slide element is U-shaped and includes an open end and a closed end, the open end receiving and coupling to the inlet end of the nozzle when in the locked position.

4. The dispensing assembly of claim 3, wherein the inlet end of the nozzle includes a flange and the U-shaped slide element includes a recess receiving the flange to couple the U-shaped slide element to the inlet end of the nozzle in the locked position.

5. The dispensing assembly of claim 1, wherein the first connecting element and the second connecting element are respectively sized and configured to be coupled together with a friction fit.

6. A dispensing assembly for dispensing a mixture of a first fluid component and a second fluid component, comprising:
    a container including a first chamber and a second chamber, the first chamber and the second chamber adapted to respectively hold the first fluid component and the second fluid component;
    a nozzle having an inlet end and an outlet end;
    first connecting element and second connecting element at the inlet end of the nozzle;
    third connecting element and fourth connecting element associated with the container and respectively communicating with the first chamber and the second chamber, the first connecting element and the second connecting element respectively capable of being removably engaged with a frictional fit to the third connecting element and the fourth connecting element to establish respective, independent fluid paths from the first chamber and the second chamber into the inlet end of the nozzle; and
    a non-rotatable coupling element movable in a linear manner between locked position and unlocked position to selectively couple the inlet end of the nozzle to the container,
    wherein the non-rotatable coupling element further comprises a slide element capable of sliding along a support structure extending from the container, the slide element slideable in a linear manner to engage the support structure and the inlet end of the nozzle when the slide element is in the locked position.

7. The dispensing assembly of claim 6, wherein the first connecting element and the second connecting element are part of a unitary insert positioned generally between the inlet end of the nozzle and the third connecting element and the fourth connecting element.

8. The dispensing assembly of claim 6, wherein the non-rotatable coupling element further comprises a slide element carried for sliding movement along support structure on the container, the slide element slidable in a linear manner between the locked position and unlocked positions, wherein the nozzle is capable of being decoupled from the container when the slide element is in the unlocked position.

9. The dispensing assembly of claim 8, wherein the slide element is U-shaped and includes an open end and a closed end, the open end receiving and coupling to the inlet end of the nozzle when in the locked position.

10. The dispensing assembly of claim 9, wherein the inlet end of the nozzle includes a flange and the U-shaped slide element includes a recess receiving the flange to couple the U-shaped slide element to the inlet end of the nozzle in the locked position.

11. The dispensing assembly of claim 8, wherein the support structure further comprises an upstanding rail extending from the container and having a T-shaped cross-section, the slide element including a flange engaging the rail for guiding the movement of the slide element along the rail.

12. The dispensing assembly of claim 6, wherein the first connecting element and the second connecting element are respectively sized and configured to be received with a friction fit within the third connecting element and the fourth connecting element.

13. The dispensing assembly of claim 6, further comprising a static mixer element in the nozzle for mixing the first fluid component and the second fluid component prior to dispensing a mixture of the first fluid component and the second fluid component from the outlet end.

14. The dispensing assembly of claim 6, wherein the first connecting element, the second connecting element, the third connecting element and the fourth connecting element respectively further comprise first projecting tube, second projecting tube, third projecting tube and fourth projecting tube, and wherein the first projecting tube and the third projecting tube are capable of being frictionally fit together and the second projecting tube and fourth the projecting tube are capable of being frictionally fit together to establish the respective, independent fluid paths.

15. A dispensing assembly for dispensing a mixture of a first fluid component and a second fluid component, comprising:
a container including a first chamber and a second chamber, the first chamber and the second chamber adapted to respectively hold the first fluid component and the second fluid component;
a nozzle having an inlet end and an outlet end;
first connecting element and second connecting element coupled to each other at the inlet end of the nozzle;
third connecting element and fourth connecting element associated with the container and respectively communicating with the first chamber and the second chamber, the first connecting element and the second connecting element respectively capable of being removably engaged with a frictional fit to the third connecting element and the fourth connecting element to establish respective, independent fluid paths from the first chamber and the second chamber into the inlet end of the nozzle;
a rail carried by the container and connected to the third connecting element and the fourth connecting element; and
a non-rotatable coupling element carried for sliding movement in a linear manner on the rail between locked position and unlocked position, the non-rotatable coupling element operative to selectively couple the inlet end of the nozzle to the container when in the locked position and allowing the nozzle to be removed from the container when in the unlocked position.

16. The dispensing assembly of claim 15, wherein the first connecting element and the second connecting element are part of a unitary insert positioned between the inlet end of the nozzle and the third element and the fourth connecting element.

17. The dispensing assembly of claim 15, wherein the non-rotatable coupling element is U-shaped and includes an open end and a closed end, the open end receiving and coupling to the inlet end of the nozzle when in the locked position.

18. The dispensing assembly of claim 17, wherein the inlet end of the nozzle includes a flange and the non-rotatable U-shaped coupling element includes a recess receiving the flange to couple the non-rotatable U-shaped coupling element to the inlet end of the nozzle in the locked position.

19. The dispensing assembly of claim 15, wherein the rail has a T-shaped cross-section, the non-rotatable coupling element including a flange engaging the rail for guiding the movement of the slide element along the rail.

20. The dispensing assembly of claim 15, wherein the first connecting element and the second element are respectively sized and configured to be received with a friction fit within the third connecting element and the fourth element.

21. The dispensing assembly of claim 15, wherein the first connecting element, the second connecting element, the third connecting element and the fourth connecting element respectively further comprise first projecting tube, second projecting tube, third projecting tube and fourth projecting tube, and wherein the first projecting tube and third projecting tube are capable of being frictionally fit together and the second projecting tube and the fourth projecting tube are capable of being frictionally fit together to establish the respective, independent fluid paths.

22. A method of assembling a dispenser, comprising:
fluidly coupling first connecting element associated with an inlet end of a nozzle to second connecting element of a container configured to hold a fluid in a chamber; and
slidably moving an open end of a non-rotatable U-shaped coupling element in a linear manner over an inlet end of the nozzle and along an upstanding rail extending from the container having a T-shaped cross section from an unlocked position to a locked position to couple the nozzle to the container.

23. The method of claim 22, wherein the non-rotatable U-shaped coupling element includes a recess and the inlet end of the nozzle includes a flange received within the recess, and wherein slidably moving the non-rotatable U-shaped coupling element further comprises:
guiding the recess of the non-rotatable U-shaped coupling element along the flange.

24. The method of claim 22, wherein the first connecting element and the second connecting element further comprise tubular elements and fluidly coupling the first connecting element and the second connecting element to each other further comprises friction fitting the first connecting element and the second connecting element to each other.

25. A method of assembling a dispenser and dispensing a mixture of a first fluid component and a second fluid component, comprising:
fluidly coupling and frictionally fitting first connecting element and second connecting element associated with a nozzle respectively to third connecting element and fourth connecting element of a container holding the first fluid component and the second fluid component in respective first chamber and second chamber;

moving a non-rotatable coupling element in a linear manner from an unlocked position to a locked position to couple the nozzle to the container, the non-rotatable coupling element further comprising a slide element capable of sliding along a support structure extending from the container, the slide element slideable in a linear manner to engage the support structure and the inlet end of the nozzle when the slide element is in the locked position;

directing the first fluid component from the first chamber through the first connecting element and the third connecting element into the nozzle;

directing the second fluid component from the second chamber through the second connecting element and the fourth connecting element into the nozzle;

mixing the first fluid component and the second fluid component in the nozzle; and dispensing the mixture of the first fluid component and the second fluid component out of the nozzle.

26. The method of claim 25, wherein the non-rotatable coupling element further comprises a U-shaped element including an open end and a closed end, and sliding the non-rotatable coupling element further includes sliding the open end in linear manner over an inlet end of the nozzle into the locked position.

27. The method of claim 25, wherein fluidly coupling the first connecting element and the second connecting element to the third connecting element and the fourth connecting element further comprises friction fitting the first connecting element to the third connecting element and friction fitting the second connecting element to the fourth connecting element.

28. The method of claim 25, wherein the first connecting element, the second connecting element, the third connecting element and the fourth connecting element respectively further comprise first projecting tube, second projecting tube, third projecting tube and fourth projecting tube, and the step of fluidly coupling the first connecting element and the second connecting element respectively to the third connecting element and the fourth connecting element further comprises:

friction fitting the first projecting tube to the third projecting tube; and friction fitting the second projecting tube to the fourth projecting tube.

* * * * *